(12) United States Patent
Kerschgens et al.

(10) Patent No.: US 10,507,887 B2
(45) Date of Patent: Dec. 17, 2019

(54) DRIVE UNIT FOR FITTING OR RETROFITTING A BICYCLE

(71) Applicants: Daniel Kerschgens, Vienna (AT);
Heinz Georg Russwurm, Vienna (AT)

(72) Inventors: Daniel Kerschgens, Vienna (AT);
Heinz Georg Russwurm, Vienna (AT)

(\*) Notice: Subject to any disclaimer, the term of this patent is extended or adjusted under 35 U.S.C. 154(b) by 257 days.

(21) Appl. No.: 15/533,272

(22) PCT Filed: Dec. 2, 2015

(86) PCT No.: PCT/EP2015/078278
§ 371 (c)(1),
(2) Date: Jun. 5, 2017

(87) PCT Pub. No.: WO2016/087484
PCT Pub. Date: Jun. 9, 2016

(65) Prior Publication Data
US 2017/0361899 A1    Dec. 21, 2017

(30) Foreign Application Priority Data

Dec. 3, 2014   (AT) ............................... A 50877/2014

(51) Int. Cl.
*B62M 6/65*       (2010.01)
*H02K 1/12*       (2006.01)
(Continued)

(52) U.S. Cl.
CPC .............. *B62M 6/65* (2013.01); *B62L 1/005* (2013.01); *H02K 1/12* (2013.01); *H02K 5/26* (2013.01);
(Continued)

(58) Field of Classification Search
CPC . B62M 6/10; B62M 6/15; B62M 6/20; B62M 6/25; B62M 6/45; B62M 6/55;
(Continued)

(56) References Cited

U.S. PATENT DOCUMENTS 4,641,080 A    2/1987  Glennon et al.
5,474,150 A *  12/1995 Mabuchi .................. B62M 6/60
                                                    180/220

(Continued)

FOREIGN PATENT DOCUMENTS

DE        10127769       12/2002
DE       102010026405     1/2012
(Continued)

*Primary Examiner* — Emily P Pham
(74) *Attorney, Agent, or Firm* — Dykema Gossett PLLC

(57) ABSTRACT

The invention relates to a drive unit for fitting or retrofitting a two-wheeled vehicle (1), preferably a bicycle, having an electric motor which is designed as a disc motor (10), comprising a rotor disc (11) having permanent magnets (12) and an annular stator (13) with windings, which generate an electrical alternating field for driving the rotor disc (11), wherein the rotor disc (11) can be fastened non-rotatably to a receptacle (6) on the front or rear wheel of the two-wheeled vehicle (1) and the annular stator (13) can be fastened to a frame part (4, 5) of the two-wheeled vehicle (1). For tool-free dismantling the annular stator (13) can be unfolded in the circumferential direction and can be removed or pulled off from the rotor disc (11).

17 Claims, 4 Drawing Sheets

(51) Int. Cl.
  *H02K 5/26* (2006.01)
  *H02K 7/14* (2006.01)
  *B62L 1/00* (2006.01)
  *H02K 11/00* (2016.01)

(52) U.S. Cl.
  CPC ........... *H02K 7/14* (2013.01); *H02K 11/0094* (2013.01); *H02K 2213/09* (2013.01)

(58) Field of Classification Search
  CPC .. B62M 6/60; B62L 1/005; B62L 3/00; F16D 2065/1332; H02K 1/12; H02K 5/26; H02K 7/14; H02K 11/0094; H02K 2213/09
  See application file for complete search history.

(56) References Cited

U.S. PATENT DOCUMENTS

| | | | |
|---|---|---|---|
| 5,874,792 A | 2/1999 | Chen et al. | |
| 5,992,587 A * | 11/1999 | Maldonado | B60T 1/065 180/219 |
| 6,283,255 B1 * | 9/2001 | Gardner | B60T 1/065 188/18 A |
| 7,017,694 B2 * | 3/2006 | Shirazawa | B62K 25/283 180/65.51 |
| 7,240,586 B2 * | 7/2007 | Wu | B62M 6/40 280/205 |
| 2002/0084134 A1 * | 7/2002 | Persson | B62M 6/10 180/312 |
| 2003/0111284 A1 * | 6/2003 | Chou | B62D 61/02 180/220 |
| 2007/0188037 A1 | 8/2007 | Lau | |
| 2009/0082914 A1 | 3/2009 | Yuan | |
| 2011/0101901 A1 * | 5/2011 | Zhu | H02K 16/00 318/400.14 |
| 2011/0139530 A1 * | 6/2011 | Ananthakrishna | B62K 15/008 180/206.5 |
| 2011/0198144 A1 | 8/2011 | Hsu et al. | |
| 2011/0259658 A1 * | 10/2011 | Huang | B60K 1/04 180/65.51 |
| 2012/0234615 A1 * | 9/2012 | Takamura | B60K 1/04 180/68.5 |
| 2014/0060246 A1 * | 3/2014 | Liao | B62M 6/55 74/665 A |
| 2014/0077581 A1 * | 3/2014 | Kanno | B60K 17/043 301/6.5 |
| 2014/0345421 A1 * | 11/2014 | Gingl | B62M 6/55 74/661 |
| 2015/0158550 A1 * | 6/2015 | Kawakami | B62M 6/55 180/206.2 |
| 2015/0369316 A1 * | 12/2015 | Muehlbauer | B62M 6/60 188/72.1 |
| 2016/0137254 A1 * | 5/2016 | Lee | B62K 15/008 180/206.5 |

FOREIGN PATENT DOCUMENTS

| | | |
|---|---|---|
| DE | 102012205361 | 10/2013 |
| EP | 0884237 | 12/1998 |
| WO | 2008056973 | 5/2008 |

* cited by examiner

DRIVE UNIT FOR FITTING OR RETROFITTING A BICYCLE

The invention relates to a drive unit for fitting or retrofitting a two-wheeled vehicle, preferably a bicycle, having an electric motor which is designed as a disc motor, comprising a rotor disc having permanent magnets and an annular stator with windings, which generate an electrical alternating field for driving the rotor disc, wherein the rotor disc can be fastened non-rotatably to a receiving part on the front or rear wheel of the two-wheeled vehicle and the annular stator can be fastened to a frame part of the two-wheeled vehicle.

Bicycles with an auxiliary drive or bicycles which can be fitted or retrofitted with a drive unit are already long known from the prior art. The same applies to other motorised two-wheeled vehicles, such as scooters, e-bikes or e-scooters, which can be equipped with an electric motor. In the case of bicycles, a distinction is made especially between bicycles with limited pedal support and bicycles with an additional drive which is independent of the pedal.

DE 101 27 769 A1 discloses, for example, a bicycle with an electric auxiliary drive, in which the output shaft of the electric motor can be coupled to the hub of the rear wheel of the bicycle via a planetary gear. The planetary gear comprises three switching stages. The electric motor is designed as a hollow-shaft motor and is arranged with its central axis coaxially to the central axis of the rear wheel.

A bicycle with an electric auxiliary drive is known from DE 10 2010 026 405 A1. The auxiliary drive comprises an electric motor mounted on the frame, the output shaft of which extends in the longitudinal direction of the bicycle and is connected to the rear wheel in a driving manner by means of an angular gear. The auxiliary drive is offered as a retrofit kit to equip a conventional bicycle with an electric drive. The electric motor is preferably designed as a tubular motor and can be attached to the chain strut of the rear wheel with a pipe clamp.

A brushless electric machine in the form of a disc motor is known from DE 10 2012 205 361 A1, wherein permanent magnets are arranged in the rotor of the motor, which form magnetic poles in the pole shoes of the rotor. The rotor is driven by an alternating field generated in the windings arranged on an outer annular stator.

WO 2008/056973 A1 discloses an electric disc motor for equipping a bicycle, wherein the drive unit can be mounted on the front wheel or on the rear wheel of the bicycle. The disc motor has a rotor unit with permanent magnets, which are attached to the wheel hub by an inner flange. The stator unit, together with the windings of the sliding motor, is mounted in a peripheral receptacle of the rotor unit which is U-shaped in its cross-section, wherein a lever which is attached to the stator unit and which can be fastened to the brake caliper is provided for torque transmission to the frame of the bicycle. The spokes of the front or rear wheel, shortened after the installation of the drive unit, can be fastened to an outer flange of the rotor unit.

Similar drive units, designed as disc motors, for equipping bicycles are known from US 2011/0198144 A1 and US 2009/0082914 A1.

It is the object of the invention, based on the above-described prior art, to further develop a drive unit for a two-wheeled vehicle, preferably for a bicycle, in such a way that an original fitting or retrofitting of the two-wheeled vehicle with the drive unit can be carried out and also a simple and rapid removal of essential parts of the drive unit is possible.

This object is achieved according to the invention in that the annular stator can be unfolded in the circumferential direction and can be removed or pulled off from the rotor disc.

Preferably, the annular stator has a manually actuatable fixing device with which the stator can be fixed without tools in its operating position.

Electric bicycles and bicycles with auxiliary drive are unfortunately often endangered by theft and vandalism. With the present invention, it is now possible for the first time to remove essential parts of the drive unit, namely the annular stator, from the bicycle with just a few quick motions and without using tools, and to store it safely.

It is particularly advantageous if already existing structures of the bicycle can be used for mounting the individual components of the drive unit during the installation of the drive unit. Thus, the rotor disc is non-rotatably fixed to the already existing receptacle for a brake disc on the wheel hub of the front or rear wheel of the two-wheeled vehicle. For this purpose, only the respective wheel has to be removed, a possible brake disc must be removed and the rotor disc of the disc motor must be attached to the perforated rim of the brake disc.

Furthermore, according to the invention, the drive unit has fastening means, preferably an adapter, an adjusting plate and a guide element, by means of which the annular stator is fastened to the already existing receptacle for a brake caliper on the front wheel fork or the rear wheel fork (or rear wheel strut).

According to a further advantageous embodiment variant, a rechargeable energy storage unit, preferably a lithium-ion battery, is arranged on the outer circumference of the annular stator, preferably in the region of the foldable sections, which rechargeable energy storage unit together with the annular stator can be removed from the rotor and transported for charging, e.g. to the apartment or to the workplace.

The invention is explained in closer detail below with reference to the illustrated embodiment variants, wherein.

Figure 1:
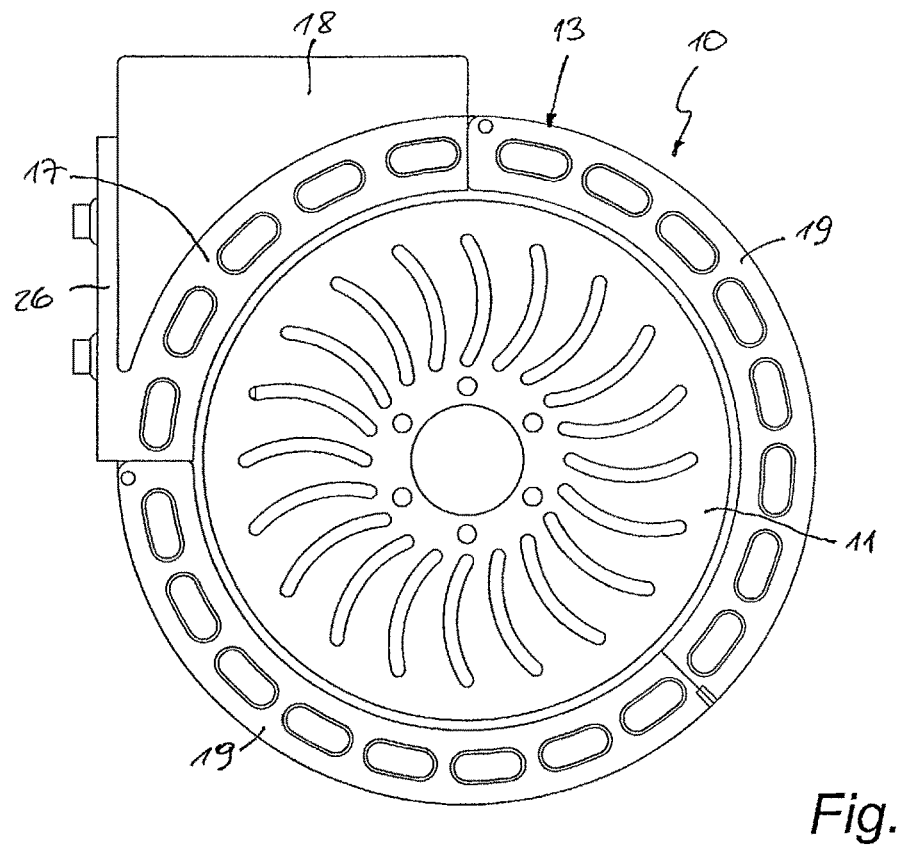
FIG. 1 shows a disc motor of the drive unit according to the invention in a front view.
Figure 2:
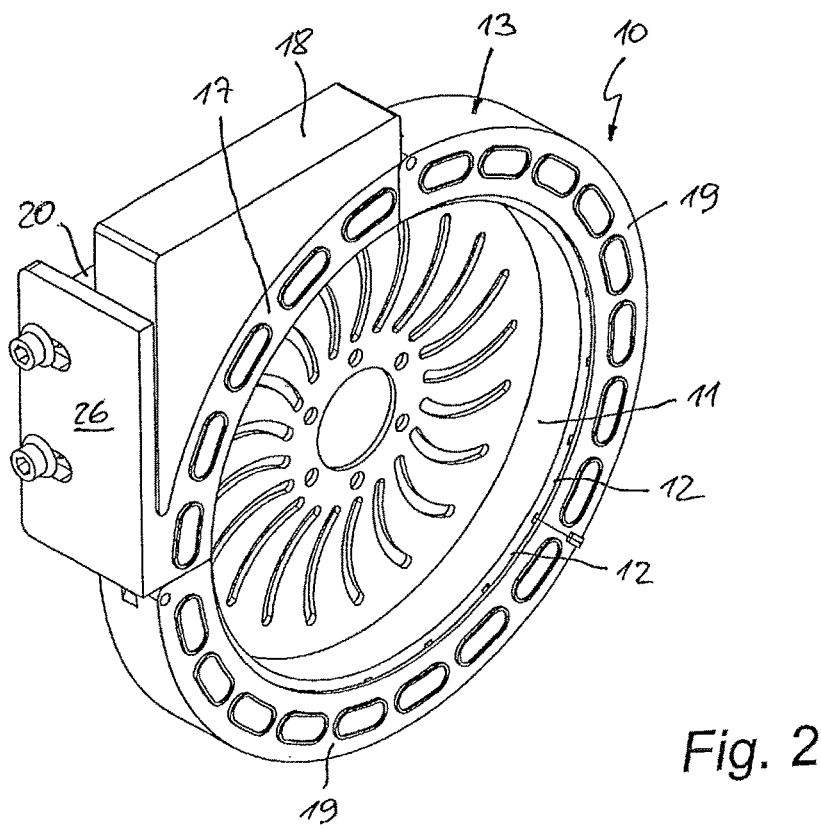
FIG. 2 shows the disc motor according to FIG. 1 in a three-dimensional representation.
Figure 3:
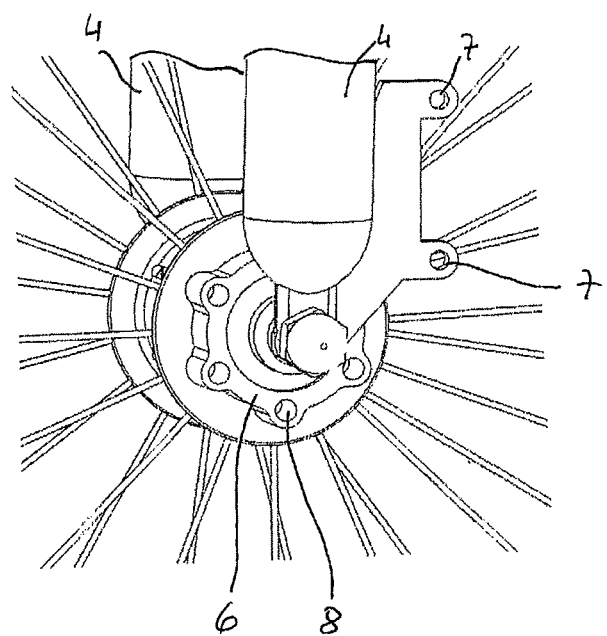
FIG. 3 shows an installation site for the disc motor according to the invention on the front wheel fork of a bicycle.
Figure 4:
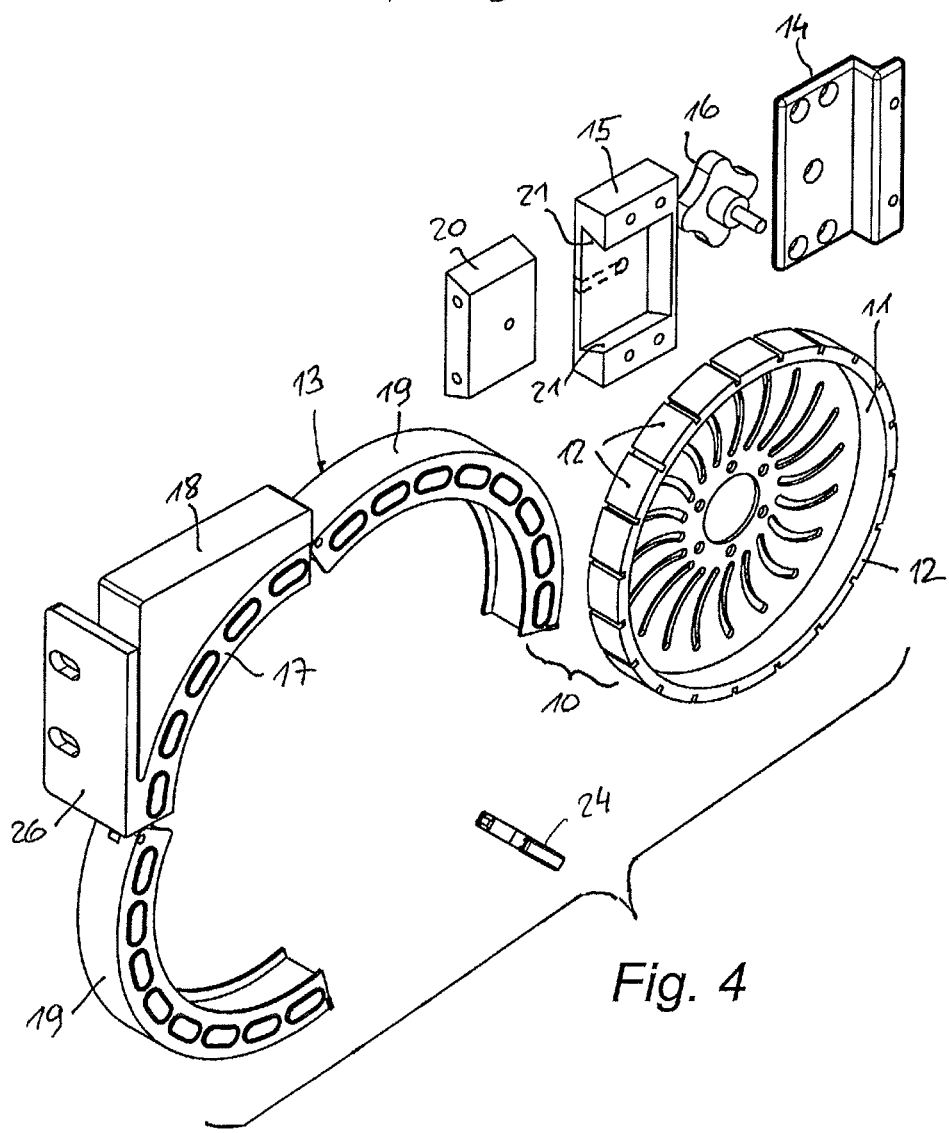
FIG. 4 shows the individual parts of the drive unit according to the invention in an exploded view.

The first variant of a drive unit, shown in FIGS. 1 to 4, for the fitting or retrofitting of a two-wheeled vehicle essentially consists of the disc motor 10 and various adapter and fastening means, which are illustrated in more detail in FIG. 4.

The disc motor 10 has a rotor disc 11 with permanent magnets 12, which by forming an air gap are surrounded by a substantially annular stator 13 together with windings, which form an electrical alternating field for driving the rotor disc 11 in a conventional manner.

Since many bicycles are already offered with brake discs, a receptacle 6 for the brake disc is provided for example on the hub of the front wheel (see FIG. 3), the perforated rim 8 of which is suitable for the mounting of the rotor disc 11 of the disc motor 10. In the case of retrofitting, only the front wheel has to be removed and the brake disc has to be removed, after which the rotor disc 11 can be fastened to the perforated rim 8 with the screws provided for the brake disc. The braking function can at least partially be replaced by the disc motor 10, which also acts as a motor brake, and, if necessary, by a rim brake.

Figure 8:
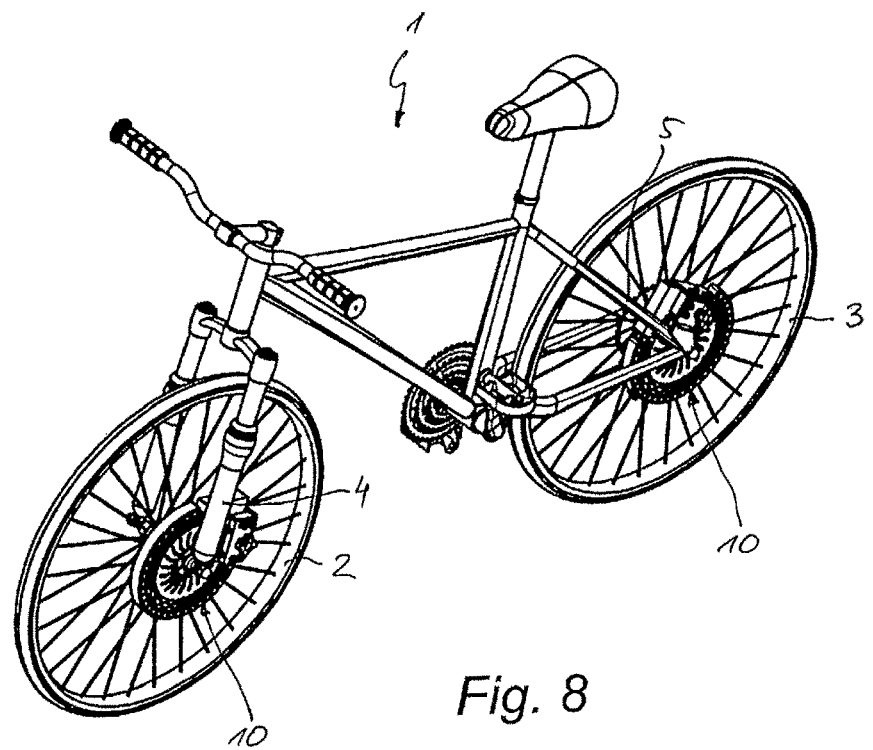
FIG. 8 shows a bicycle with the drive unit according to the invention on the front wheel and on the rear wheel.

As shown in detail in FIG. 4, the drive unit has fastening means, e.g. an adapter 14, an adjusting plate 15 and a guide element 20, with which the annular stator 13 can be fastened to the receptacle 7 for a brake caliper on the front wheel fork 4. In the case of the receptacle 7 for the brake caliper, a uniform dimension has been accepted, which is generally known under the IS2000 standard. Such a receptacle 7 for the brake caliper is also located on the rear wheel fork or the rear wheel strut 5 (see FIG. 8), so that the mounting of the disc motor 10 is also possible at this position without modification work.

In order to be able to pull the annular stator 13 from the fixedly mounted rotor disc 11 in the plane of the disc motor 10, without removing the front wheel, the stator 13 is designed to be unfoldable in the circumferential direction, wherein a manually actuatable fixing device in form of a hand wheel 16 is provided, which passes through the adjustment plate 15 during mounting from the outside and presses the guide element 20 attached to the stator 13 against the adjusting plate 15.

According to one variant, the hand wheel 16 can also be designed as a clamping lever or eccentric lever (not shown), which only needs be loosened and can remain in the guide element 20. For this purpose, only the through-bore in the adjusting plate 15 has to be designed as an oblong hole (indicated by the dashed lines) leading to the edge.

The annular stator 13 is shown in FIG. 4 in its unfolded position, and shows a base section 17, on which a housing 18 for accommodating a motor control unit is formed, wherein the two foldable sections 19 of the stator 13 are hinged to the base section 17.

The guide element 20, which is fastened to a stop plate 26 of the base section 17, can be inserted into guide structures 21 on the adjusting plate 15, e.g. in the manner of a dovetail connection, and is then fixed with the hand wheel 16 in the operating position.

In order to install the disc motor 10 of the drive unit according to the invention for the first time in an existing bicycle, the front wheel (the same applies to the rear wheel) must be removed. Then the optionally present brake disc is replaced by the rotor disc 11 of the drive unit. Furthermore, the brake caliper, if present, is removed and, in its place, the adapter 14 is screwed onto the receptacle 7 for the brake caliper. The adjusting plate 15 is then loosely screwed onto the adapter 14 in order to be able to carry out adjustments in the vertical and horizontal direction. The annular stator 13 is then unfolded and pushed over the rotor disc 11, wherein it is to be noted that the guide element 20, which must be inserted into the guide structures 21 of the adjusting plate 15, engages in the dovetail connection.

For the adjustment, which needs to be carried out only once, the drive unit has adjusting inserts 23 (see FIG. 7) which are clipped onto the rotor disc 11 during the initial installation in order to define a radial air gap between the rotor disc 11 and the annular stator 13. Thereafter, the foldable sections 19 of the stator 13 are folded together and fixed together by means of the detent elements 25 arranged on the foldable sections 19 and the shiftable, U-shaped locking element 24 (see FIG. 6).

Now, all the screws on the adjusting plate 15 and the stop plate 26 are tightened. The stator is then unfolded, the adjustment inserts 23 are removed and the foldable sections 19 are fixed in the operating position by the manually shiftable locking element 24.

Furthermore, it is also possible to replace the locking element 24 by a tensioning or clamping lever acting in the circumferential direction, which remains on the annular stator 13 and can be easily released and locked by.

In order to remove the annular stator 13 later on, it must only be unfolded and removed from the dovetail joint. A new adjustment for re-use is no longer necessary.

Figure 5:
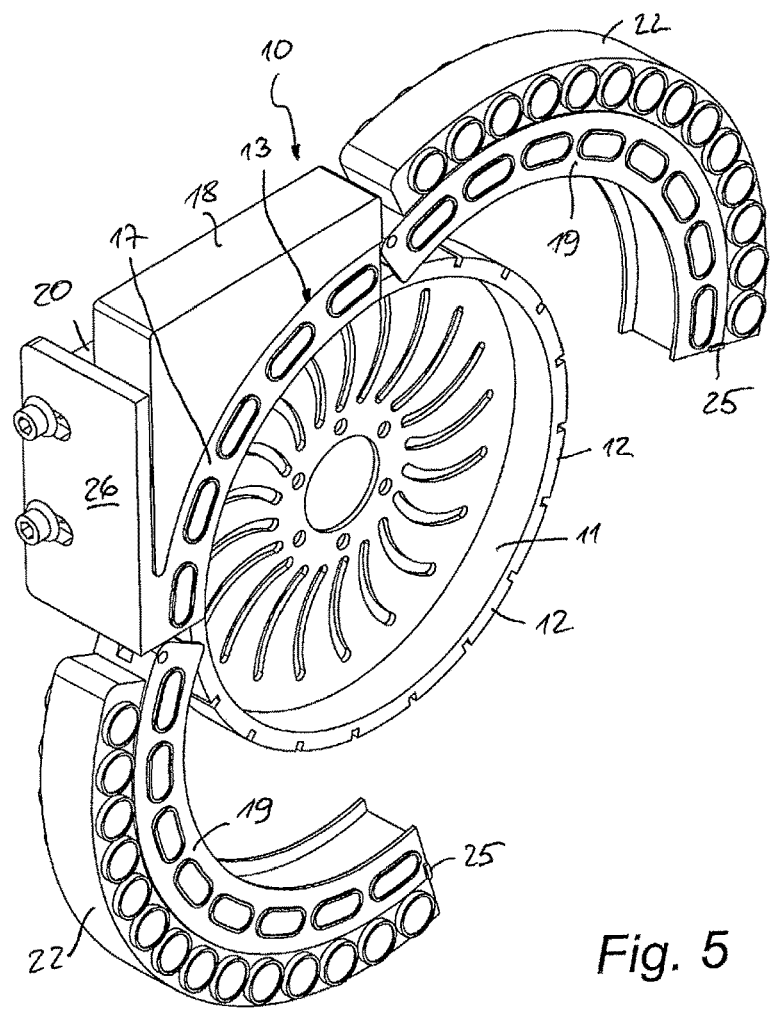
FIG. 5 shows an embodiment variant of the disc motor according to FIG. 1 with a rechargeable energy storage unit.
Figure 6:
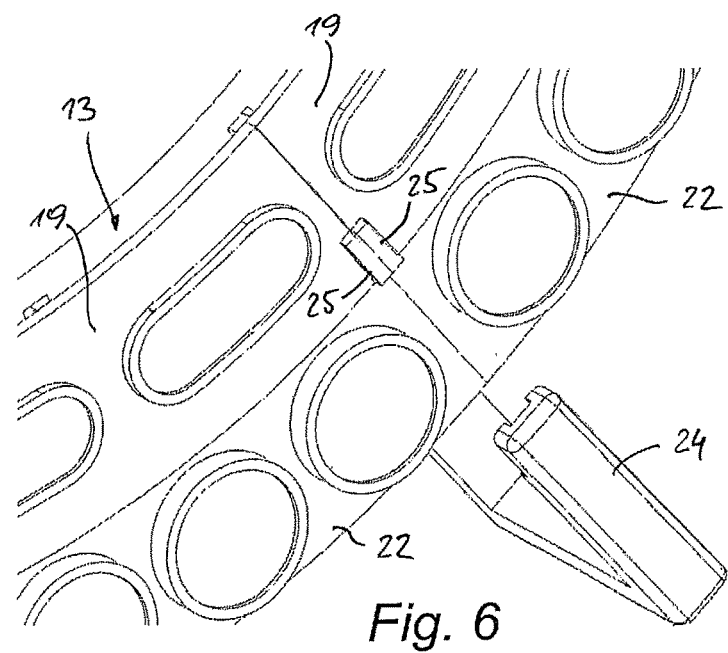
FIG. 6 shows a detailed view of a locking device of the foldable stator.
Figure 7:
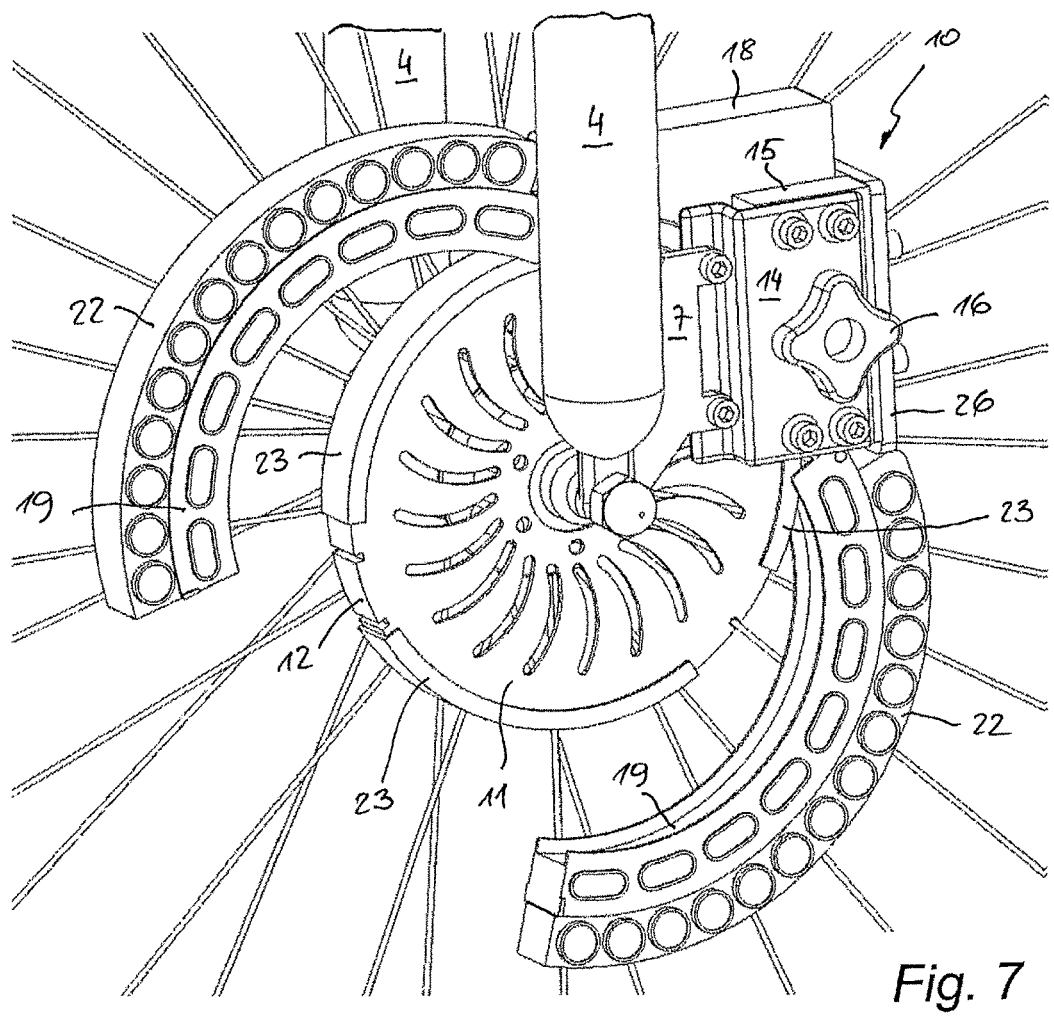
FIG. 7 shows the disc motor of the drive unit according to the invention according to FIG. 5 in an installation situation on the front wheel of a bicycle.

The embodiment variant shown in FIGS. 5, 6 and 7 has a rechargeable energy storage unit 22, e.g. a lithium-ion battery, on the outer circumference of the annular stator 13, preferably in the region of the foldable sections 19.

Flexible electrical connecting cables, which are guided across the joints between the base section 13 and the foldable sections 19, are not shown.

Advantageously, in this embodiment variant, the rechargeable energy storage unit 22 can be removed from the bicycle simultaneously with the annular stator 13 and is thus protected against damage and theft. Furthermore, no wiring must be installed between the disc motor 10 and the energy storage unit on the bicycle since these are already integrated in the compact unit.

The motor controller arranged in the housing 18 can occur in a wireless manner, e.g. via mobile communication means and/or via torque sensors in the pedals of the bicycle and wireless signal transmission.

According to the invention, the disc motor 10 can also be used as a motor brake and a unit for energy recovery. A corresponding control can be carried out wirelessly via a sensor in the brake lever together with wireless signal transmission.

The disc motor 10 can preferably be designed as a brushless synchronous machine.

The invention claimed is:

1. A drive unit for fitting or retrofitting a two-wheeled vehicle, having an electric motor which is designed as a disc motor, comprising a rotor disc having permanent magnets and an annular stator with windings, which generate an electrical alternating field for driving the rotor disc, wherein the rotor disc is configured to be fastened non-rotatably to a receptacle on a front or rear wheel of the two-wheeled vehicle and the annular stator is configured to be fastened to a frame part of the two-wheeled vehicle, unfolded in a circumferential direction and removed or pulled off from the rotor disc, wherein the annular stator includes
   a manually actuatable fixing device configured and arranged to fix the annular stator, in its operating position, to the frame part without tools.

2. The drive unit according to claim 1, wherein the rotor disc is configured to be connected non-rotatably to the receptacle for a brake disc on a wheel hub of the front or rear wheel of the two-wheeled vehicle.

3. The drive unit according to claim 1, wherein the drive unit comprises adjustment inserts configured to be clipped onto the rotor disc during an initial installation to define a radial air gap between the rotor disc and the annular stator.

4. The drive unit according to claim 1, wherein the disc motor (10) is configured to be used as a motor brake and for energy recovery.

5. The drive unit according to claim 1, wherein the disc motor (10) is designed as a brushless synchronous machine.

6. The drive unit according to claim 1, wherein the drive unit comprises fastening means by means of which the annular stator is configured to be fastened to a receptacle for a brake calliper on a front wheel fork or a rear wheel fork or a rear wheel strut.

7. The drive unit according to claim 6, wherein the fastening means includes an adapter, an adjusting plate and a guide element.

8. The drive unit according to claim 1, wherein a rechargeable energy storage unit is arranged on an outer circumference of the annular stator.

9. The drive unit according to claim 8, wherein the rechargeable energy storage unit is a lithium-ion battery, and the rechargeable energy storage unit is arranged in a region of foldable sections.

10. The drive unit according to claim 1, wherein the annular stator includes a base section on which a housing is formed for accommodating a motor control unit, and at least one foldable section of the annular stator hinged to the base section.

11. The drive unit according to claim 10, further including detent elements arranged on ends of the at least one foldable section of the annular stator, on which a substantially U-shaped locking element is configured to be pushed in a closed position of the annular stator.

12. The drive unit according to claim 10, wherein the annular stator includes two foldable sections of the annular stator that are hinged to the base section.

13. The drive unit according to claim 10, further including a fastening means, namely a guide element, is integrally attached or fastened to the base section of the annular stator, and is configured to be pushed into guide structures on a further fastening means, namely an adjusting plate.

14. The drive unit according to claim 13, wherein the adjusting plate is a dovetail joint, and is configured to be fixed by means of a hand wheel.

15. A drive unit for fitting or retrofitting a two-wheeled vehicle, having an electric motor which is designed as a disc motor, comprising:
a rotor disc including permanent magnets, the rotor disc configured to be fastened non-rotatably to a receptacle on a front or rear wheel of the two-wheeled vehicle; and
an annular stator including windings, the annular stator and rotor disc configured to generate an electrical alternating field for driving the rotor disc, and the annular stator is configured to be fastened to a frame part of the two-wheeled vehicle, unfolded in a circumferential direction and removed or pulled off from the rotor disc;
wherein the annular stator includes a base section on which a housing is formed for accommodating a motor control unit, and at least one foldable section of the annular stator is hinged to the base section.

16. The drive unit of claim 15, further including a fastening means, namely a guide element, integrally attached or fastened to the base section of the annular stator, and configured to be pushed into guide structures on a further fastening means, namely an adjusting plate.

17. The drive unit of claim 15, further including detent elements arranged on ends of the least one foldable section of the annular stator, on which a substantially U-shaped locking element is configured to be pushed in the closed position of the annular stator.

* * * * *